(12) United States Patent
Takeuchi et al.

(10) Patent No.: US 11,390,274 B2
(45) Date of Patent: Jul. 19, 2022

(54) PARKING INFORMATION MANAGEMENT SERVER, PARKING ASSIST DEVICE, AND PARKING ASSIST SYSTEM

(71) Applicant: Faurecia Clarion Electronics Co., Ltd., Saitama (JP)

(72) Inventors: Kenji Takeuchi, Saitama (JP); Tatsuro Narita, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/200,189

(22) Filed: Mar. 12, 2021

(65) Prior Publication Data
US 2021/0284139 A1    Sep. 16, 2021

(30) Foreign Application Priority Data

Mar. 13, 2020    (JP) .............................. JP2020-044197

(51) Int. Cl.
  *B60W 30/06*    (2006.01)
  *G08G 1/14*    (2006.01)
  *G06V 20/58*    (2022.01)
(52) U.S. Cl.
  CPC ............. *B60W 30/06* (2013.01); *G06V 20/58* (2022.01); *G08G 1/142* (2013.01); *G08G 1/148* (2013.01); *B60W 2420/403* (2013.01)
(58) Field of Classification Search
  CPC ........... B60W 30/06; B60W 2420/403; G06K 9/00805; G08G 1/142; G08G 1/148; H04W 4/021; H04W 4/44
  See application file for complete search history.

(56) References Cited

U.S. PATENT DOCUMENTS

2004/0020699 A1 *  2/2004  Zalila .................. B62D 15/028
                                                         180/204
2016/0229404 A1    8/2016  Byun
(Continued)

FOREIGN PATENT DOCUMENTS

GB        2568264       5/2019
JP      2009-175962     8/2009
(Continued)

OTHER PUBLICATIONS

Extended European Search Report dated Jul. 21, 2021 in European Application No. 21162324.4.

*Primary Examiner* — Daryl C Pope
(74) *Attorney, Agent, or Firm* — Wenderoth, Lind & Ponack, L.L.P.

(57) ABSTRACT

A parking information management server includes a receiver configured to receive a parking information item which has transmitted from one or more vehicles, the parking information item including a traveling path in which the vehicle has traveled as well as a parking area and an obstacle which are acquired by the vehicle in a parking lot the vehicle has used, a memory configured to store the parking information item received by the receiver, a map creator configured to create a map including the parking area and the obstacle based on the parking information item stored in the memory, and a transmitter configured to automatically transmit the map created by the map creator and the traveling path stored in the memory to a vehicle which has requested the map.

4 Claims, 6 Drawing Sheets

(56) References Cited

U.S. PATENT DOCUMENTS

| | | | |
|---|---|---|---|
| 2019/0251842 A1* | 8/2019 | Wunder | H04W 4/021 |
| 2019/0291721 A1 | 9/2019 | Sakano et al. | |
| 2020/0242934 A1* | 7/2020 | Xu | G01C 21/3685 |
| 2020/0292320 A1 | 9/2020 | Sakano et al. | |
| 2020/0346639 A1* | 11/2020 | Tashiro | G01C 21/34 |

FOREIGN PATENT DOCUMENTS

| | | |
|---|---|---|
| JP | 2018-4343 | 1/2018 |
| JP | 2018-112506 | 7/2018 |
| JP | 2018-189457 | 11/2018 |

\* cited by examiner

PARKING INFORMATION MANAGEMENT SERVER, PARKING ASSIST DEVICE, AND PARKING ASSIST SYSTEM

CROSS-REFERENCE TO RELATED APPLICATION

The present application is based on and claims priority from Japanese Patent Application No. 2020-044197 filed on Mar. 13, 2020, the disclosure of which is hereby incorporated by reference in its entirety.

BACKGROUND

This disclosure relates to a parking information management server, a parking assist device, and a parking assist system.

A parking assist device which stores a surrounding environment of a parking lot at home, and automatically parks an own vehicle in the parking lot based on the stored information is developed as taught in JP2018-189457A, for example. With this technique, information on a structure around the own vehicle, which is detected by a camera and/or an ultrasonic detector mounted on the own vehicle when a driver manually parks the own vehicle, is stored, and the own vehicle is automatically guided to the parking lot based on the stored information at later parking.

The driver can thereby implement automatic parking with a simple operation of pressing a button of an application software of a smartphone or an onboard equipment, for example.

However, the technique taught in JP2018-189457A aims a frequently used specific parking lot such as a parking lot at home and a parking lot at work. Therefore, the above technique cannot be adopted for an unspecified parking lot other than these parking lots, such as a parking lot at a commercial building, which is sporadically or incidentally used by shopping and the like, and a public toll parking lot because such parking lots are infrequently used or have not been used before.

That is to say, there is no stored information on a parking lot which has not been used before by a driver, so that the automatic parking cannot be implemented based on the memory. Moreover, when information on an infrequently used parking lot is stored, a large capacity memory is required. Such a technique is not practical.

Accordingly, this disclosure has been made in view of the above circumstances, and an object of this disclosure is to provide a parking information management server, a parking assist device, and a parking assist system, which can implement automatic parking in an unspecified or infrequently used parking lot similar to a frequently used specific parking lot.

SUMMARY

To achieve the above object, this disclosure provides a parking information management server including a receiver configured to receive a parking information item which has transmitted from one or more vehicles, the parking information item including a traveling path in which the vehicle has traveled as well as a parking area and an obstacle which are acquired by the vehicle in a parking lot the vehicle has used, a memory configured to store the parking information item received by the receiver, a map creator configured to create a map including the parking area and the obstacle based on the parking information item stored in the memory, and a transmitter configured to automatically transmit the map created by the map creator and the traveling path stored in the memory to a vehicle which has requested the map.

This disclosure also provides a parking assist device including a receiver configured to receive the map transmitted from the parking information management server according to this disclosure, a position detector configured to detect a position of the vehicle, a camera configured to detect a parking area by photographing a periphery of the vehicle, an obstacle detector configured to detect an obstacle in the periphery of the vehicle, and a guide signal output part configured to output a signal to a vehicle controller that controls driving of the vehicle to guide the vehicle based on the map and the traveling path received by the receiver.

This disclosure also provides a parking assist system including the parking information management server according to this disclosure, and the parking assist device according to this disclosure.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

An embodiment of a parking information management server, a parking assist device, and a parking assist system of this disclosure will be described with reference to the drawings.

Figure 1:
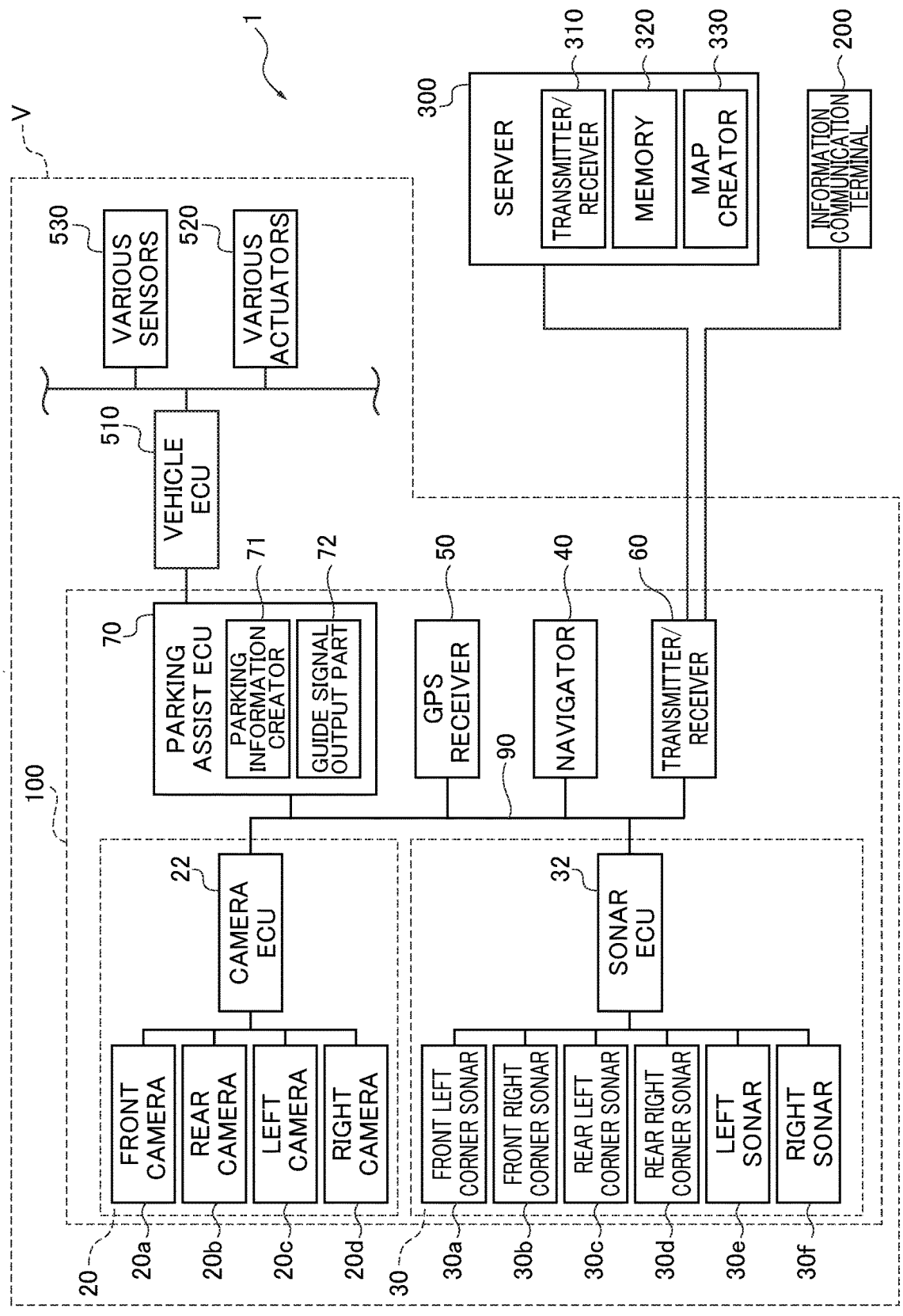
FIG. 1 is a block diagram illustrating a parking assist system according to one embodiment of this disclosure.
Figure 2:
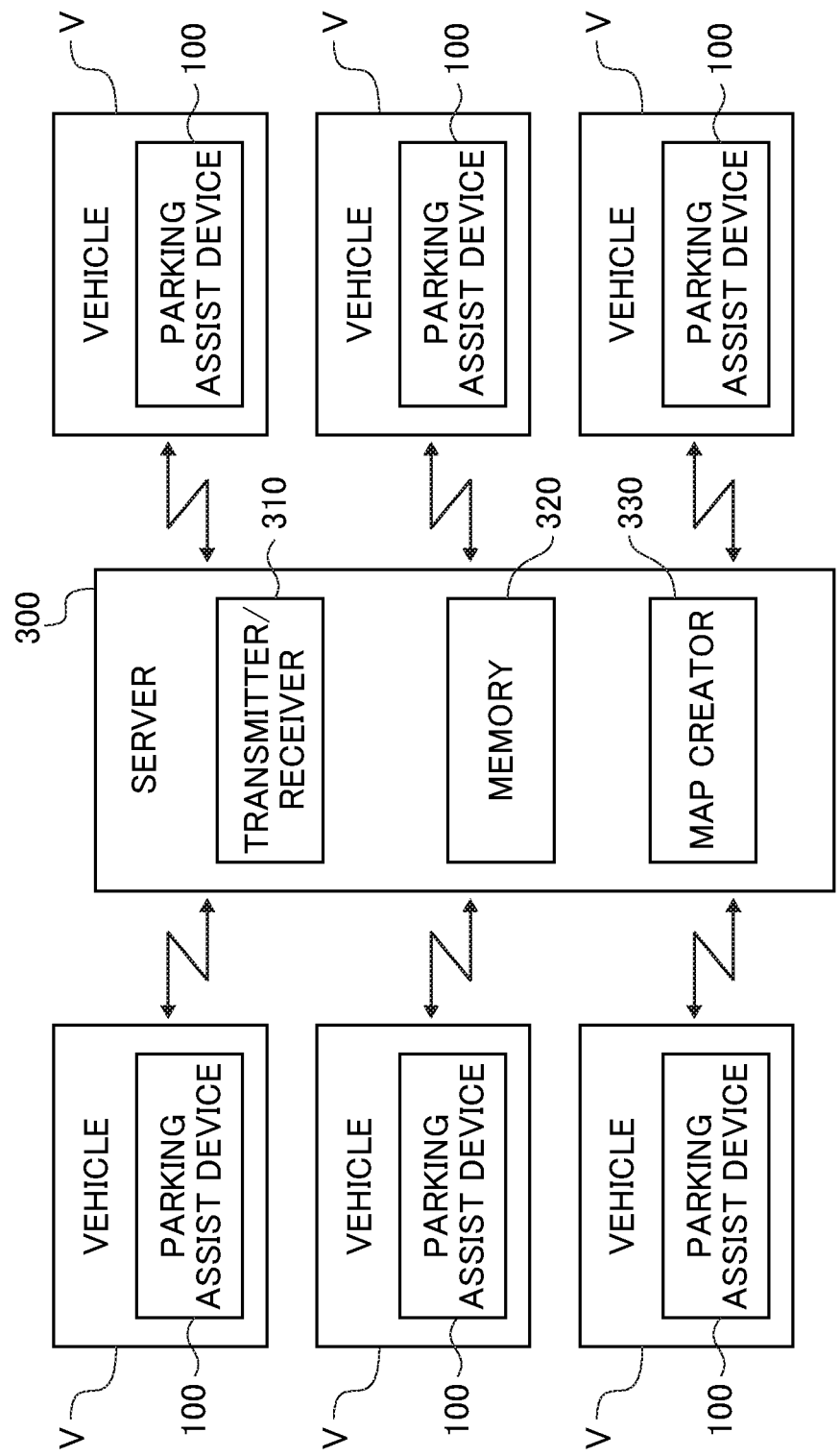
FIG. 2 is a block diagram illustrating connection between a server and a plurality of parking assist devices.

A configuration will be described. FIG. 1 is a block diagram illustrating a parking assist system 1 according to one embodiment of the present disclosure. FIG. 2 is a block diagram illustrating connection between a server 300 and a plurality of parking assist devices 100. The illustrated parking assist system 1 includes the parking assist device 100, an information communication terminal 200, and the server 300 (one example of parking information management server).

The parking assist device 100 is equipped in a vehicle V. The parking assist device 100 transmits and receives information with the server 300 through communication function, and outputs a guide signal corresponding to a driving operation for parking the vehicle V in a specific parking area to a vehicle ECU 510 which controls the driving operation of the vehicle V.

As illustrated in FIG. 2, the server 300 transmits and receives information with the parking assist devices 100 of the many vehicles V. The server 300 acquires information items (parking information items) acquired by the parking assist devices 100 of the many vehicles V to be accumulated. The information items include information items of a traveling path of the vehicle V, a parking area, and an obstacle in a parking lot P where the vehicles V have parked.

The server 300 creates a map PP of the parking lot P including a boundary line of the parking area (parking area line) and a position of an obstacle based on the parking information item acquired for each parking lot, and provides the created map PP and a traveling path K to the vehicle V traveling in the parking lot P (vehicle which has provided parking information item and another vehicle different from vehicle which has provided parking information item) for use in the parking assist device 100 of the vehicle V.

The information communication terminal 200 is an information processor including communication function, such as a smartphone and a tablet terminal. The information communication terminal 200 performs short-distance wireless communication with the parking assist device 100 by Bluetooth (registered trademark) or wireless LAN, for example. The information communication terminal 200 receives an instruction of a driver, and transmits the received instruction to a transmitter/receiver 60 of the parking assist device 100.

The parking assist device 100 includes a camera 20, a sonar 30 (obstacle detector), a GPS receiver 50 (position detector), a navigator 40, the transmitter/receiver 60, a parking assist ECU 70, and a sensor information system network 90 connecting them.

The camera 20 is attached to front, rear, right, and left portions of the vehicle V, and includes a front camera 20a, a rear camera 20b, a left camera 20c, a right camera 20d, and a camera ECU 22.

The front camera 20a photographs mainly a front area of a periphery of the vehicle V. The rear camera 20b photographs mainly a rear area of the periphery of the vehicle V. The left camera 20c photographs mainly a left area of the periphery of the vehicle V. The right camera 20d photographs mainly a right area of the periphery of the vehicle V.

The camera ECU 22 converts the images photographed by the respective cameras 20a, 20b, 20c, 20d into an overhead image as seen vertically downward from the vehicle V upward, syntheses the images to connect the images into one image over the overall periphery of the vehicle V, and creates a single overhead image.

Figure 3:
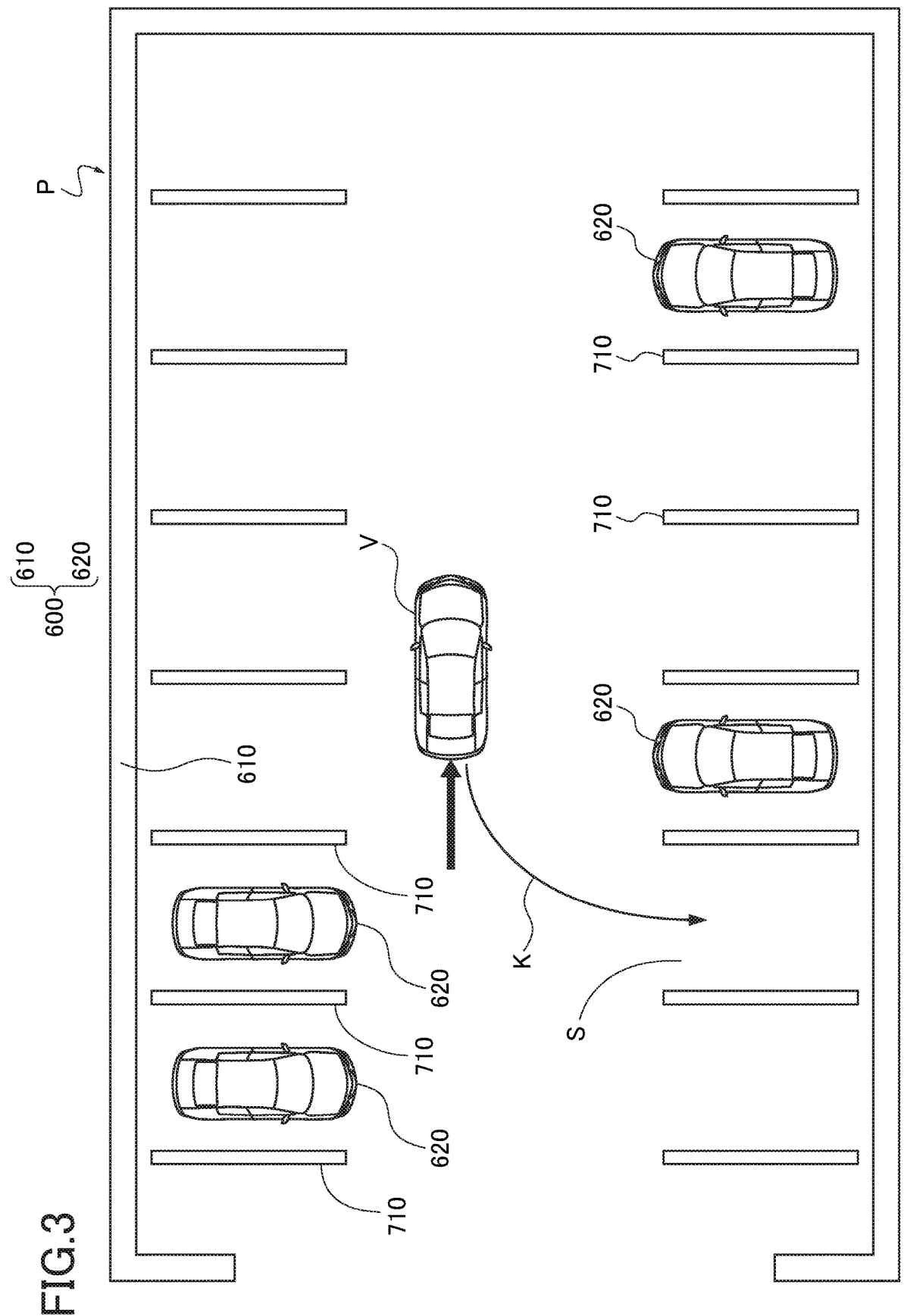
FIG. 3 is a schematic plan view illustrating a vehicle traveling in a parking lot.

FIG. 3 is a schematic plan view illustrating the vehicle V traveling in the parking lot P. When the vehicle V enters the parking lot P, the camera 20 photographs a parking area line 710 which divides the parking area and a peripheral obstacle 600 (for example, wall 610 as fixed object, which divides site of parking lot P, and another movable parked vehicle 620 which is not fixed object).

Figure 4:
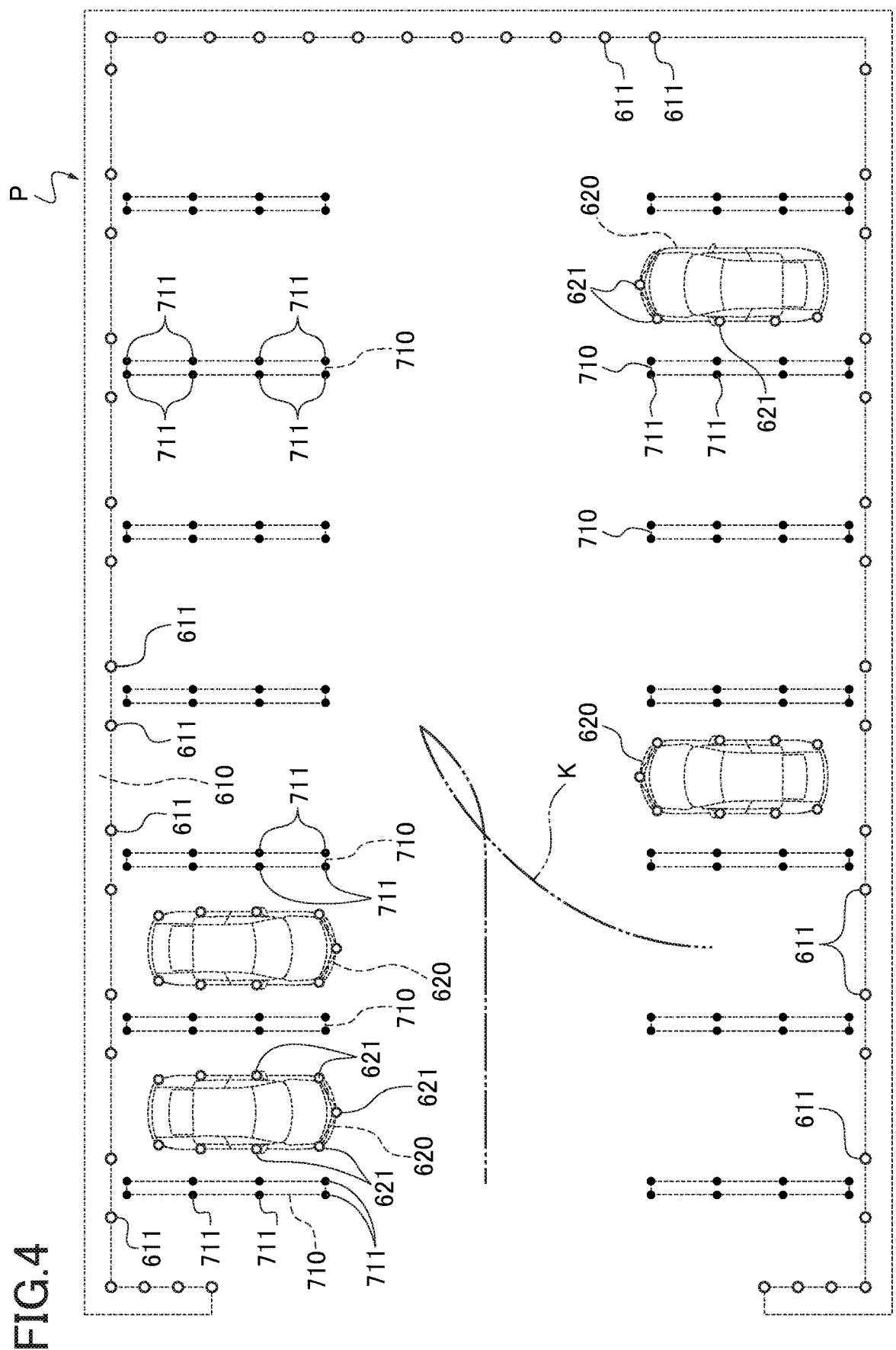
FIG. 4 is a schematic view illustrating one example of parking information stored in a memory when an arbitrary vehicle travels in a parking lot.

The camera ECU 22 detects feature points 711 such as a corner and an edge of the parking area line 710 and feature points 611, 621 of the obstacles 600, as illustrated in FIG. 4, by an image process based on the above-described single overhead image.

The sonar 30 includes six sonars 30a, 30b, 30c, 30d, 30e, 30f and a sonar ECU 32.

The front left corner sonar 30a is attached to a front left corner of the vehicle V, and detects mainly the obstacle 600 in a front left side of the vehicle V. The front right corner sonar 30b is attached to a front right corner of the vehicle V, and detects mainly the obstacle 600 in a front right side of the vehicle V.

The rear left corner sonar 30c is attached to a rear left corner of the vehicle V, and detects mainly the obstacle 600 in a rear left side of the vehicle V. The rear right corner sonar 30d is attached to a rear right corner of the vehicle V, and detects mainly the obstacle 600 in a rear right side of the vehicle V.

The left sonar 30e is attached to a left portion of the vehicle V, and detects mainly the obstacle 600 in a left side of the vehicle V. The right sonar 30f is attached to a right portion of the vehicle V, and detects mainly the obstacle 600 in a right side of the vehicle V.

The sonar ECU 32 calculates a direction and a distance of the obstacle 600, which is detected by each of the sonars 30a to 30f, from the vehicle V.

A GPS receiver 50 detects the position of the vehicle V. The navigator 40 displays, on a monitor 41, a path for guiding the vehicle V to a destination in normal traveling, and guides the vehicle V.

The parking assist ECU 70 includes a parking information creator 71 and a guide signal output part 72. The parking information creator 71 creates the parking information item in which the position of the vehicle V detected by the GPS receiver 50, the position of the feature point 711 of the parking area line 710 and the positions of the feature points 611, 621 of the obstacle 600 detected by the camera 20, and the direction and the distance of the obstacle 600 from the vehicle V detected by the sonar 30, and the traveling path K when the vehicle V is manually parked in a specific parking area S (operation by driver) are associated.

The transmitter/receiver 60 wirelessly transmits the parking information item created by the parking information creator 71 to the server 300. The transmitter/receiver 60 wirelessly receives the map PP and the traveling path K transmitted from the server 300. The transmitter/receiver 60 performs short-distance wireless communication with the information communication terminal 200 to receive the instruction of the driver for starting a parking assist operation input to the information communication terminal 200.

The guide signal output part 72 outputs, to the vehicle ECU 510 (vehicle controller), the guide signal for automatically driving the vehicle V to the specific parking area S based on the map PP and the traveling path K acquired from the server 300.

The vehicle ECU 510 controls various actuators 520 such as a driving part, a brake part, and a steering part of the vehicle V based on the input guide signal to automatically drive the vehicle V along a path to the specific parking area S while referring to detection values detected by various sensors 530 provided in the driving part, the brake part, and the steering part of the vehicle V, which are connected through the vehicle information system network 91.

The vehicle V is thereby guided to the specific parking area S to be parked therein by the automatic driving without the operation of the vehicle V by a driver.

The server 300 includes a transmitter/receiver 310, a memory 320, and a map creator 330. The transmitter/receiver 310 transmits and receives the information with the transmitter/receiver 60 of the parking assist device 100 of the vehicle V.

More specifically, the transmitter/receiver 310 of the server 300 receives the parking information items regarding the traveling paths in which the vehicles V have traveled in the parking lot P, and the parking area lines 710 and the obstacles 600 acquired by the respective vehicles V in the parking lot P. The information items are transmitted from the many vehicles V which have traveled in the parking lot P. The transmitter/receiver 310 transmits the information of the map PP for each parking lot P created by the after-described map creator 330 to the transmitter/receiver 60 of the vehicle V which has requested, in the corresponding parking lot P, the information of the map PP for each parking lot P.

The memory 320 stores the parking information item received from each vehicle V by the transmitter/receiver 310. The parking information item transmitted from each vehicle V may be the parking information item for the same parking lot or the parking information item for a different parking lot. Namely, the memory 320 stores the parking information items when the respective vehicles V are parked in a plurality of different parking lots.

As the parking information item is associated with the positional information of each vehicle V, the map creator 330 can distinguish whether the parking lots represented by a plurality of parking information items are for the same parking lot or for different parking lots.

The map creator 330 creates the map PP having the parking area line 710 showing the parking area S and the obstacle 600 in the parking lot P based on the respective parking information items for the many parking lots.

Figure 5:
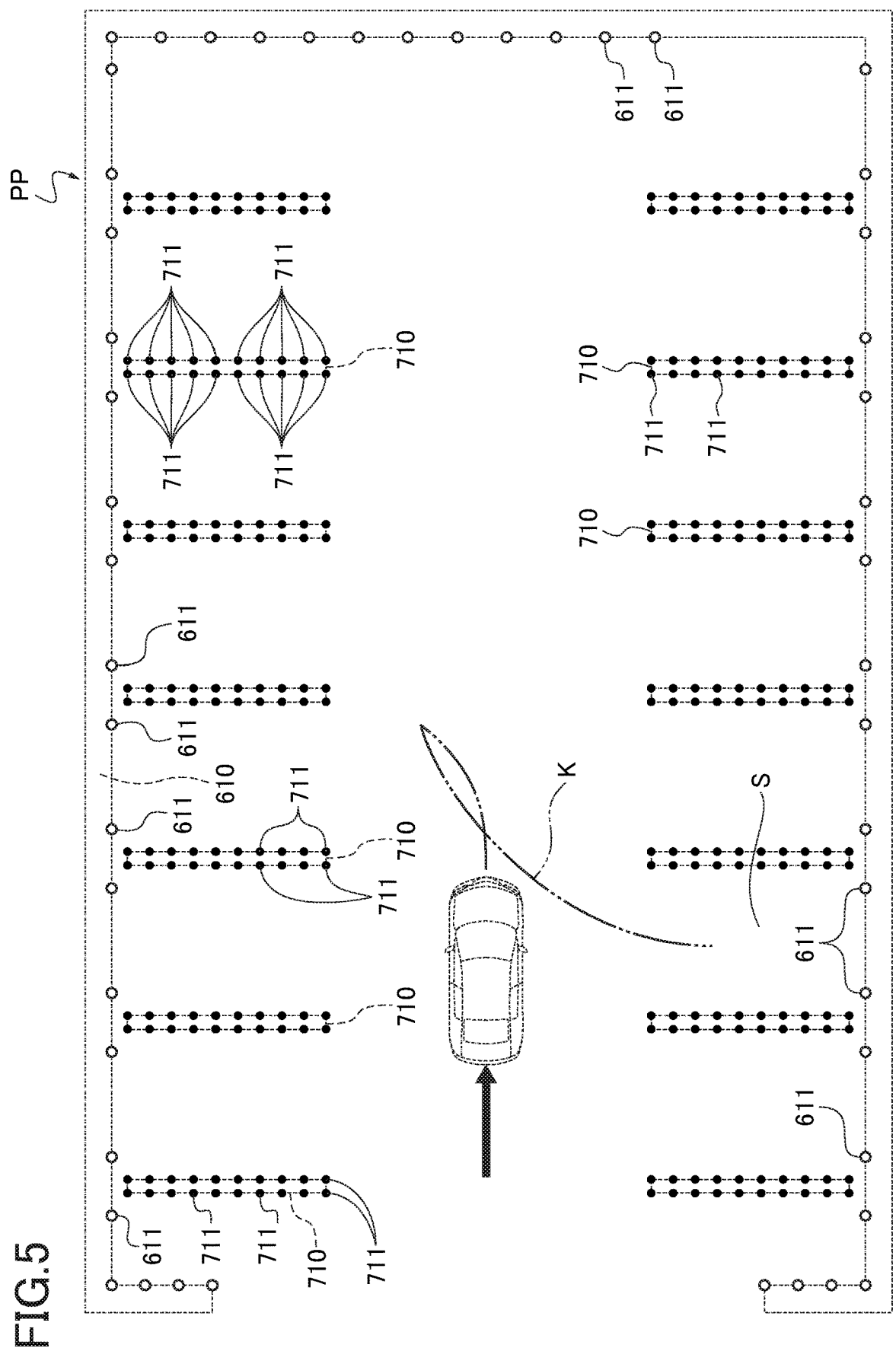
FIG. 5 is a schematic view illustrating a map and a traveling path created by accumulation with a plurality of vehicles.
Figure 6:
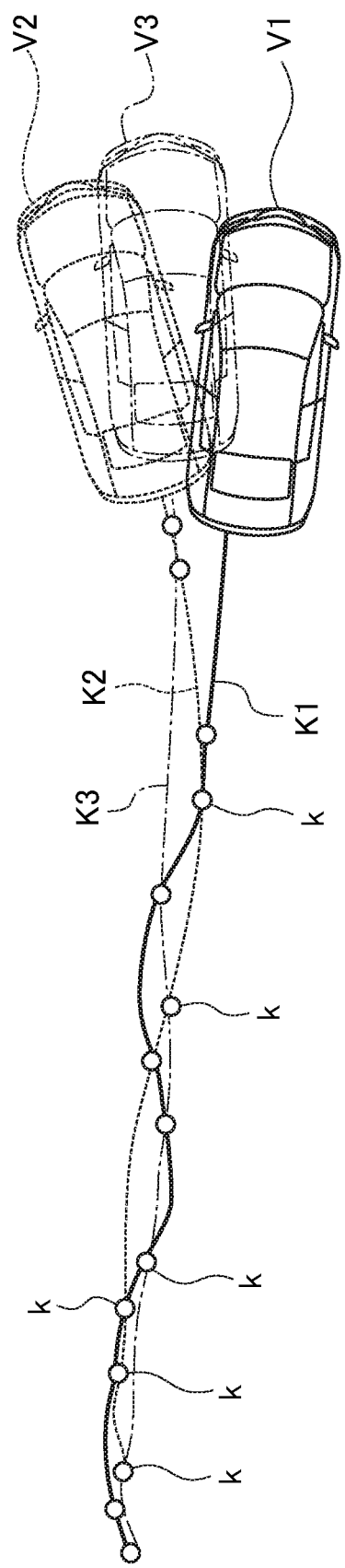
FIG. 6 is a schematic view illustrating one example of a traveling path of a plurality of vehicles.

FIG. 4 is a schematic view illustrating one example of the parking information stored in the memory 320 through the traveling of an arbitrary vehicle V in the parking lot P. FIG. 5 is a schematic view illustrating the map PP and the traveling path K created by the accumulation with a plurality of vehicles V. FIG. 6 is a schematic view illustrating one example of the traveling paths K1, K2, K3 of a plurality of vehicles V1, V2, V3.

The map PP for each parking lot P created by the map creator 330 will be described. In an arbitrary parking lot P illustrated in FIG. 3, a driver manually drives the vehicle V to the specific parking area S. In this case, when the vehicle V travels on the traveling path K, the parking information item illustrated in FIG. 4 is stored in the memory 320.

That is to say, the parking information item stored in the memory 320 includes the position of the feature point 711 of the parking area line 710, the positions of the feature points 611, 621 of the obstacle 600, the distance and the direction of the feature points 611, 621 from the vehicle V, and the traveling path K, which are associated with the position of the vehicle V, as described above.

Another vehicle V also parks in the specific parking lot P. Accordingly, each parked vehicle V transmits the parking information item, and a plurality of parking information items to the specific parking lot P are stored in the memory 320.

When there is one or more vehicles V which has/have used another parking lot P, the parking information item for another parking lot P is similarly transmitted from the vehicle V which has used another parking lot P to the memory 320 to be stored therein. Accordingly, the memory 320 stores one or more parking information items for each parking lot P.

The map creator 330 reads a plurality of parking information items for each parking lot P stored in the memory 320, and maps the feature point 711 and the feature points 611, 621 into one coordinate system to create the virtual map PP illustrated in FIG. 5.

The map PP herein is not created by mapping all of the parking information items. Namely, the parking information item stored in the memory 320 includes, among the obstacles 600, not only the feature point 611 of an always presented fixed object such as the wall 610 but also a temporarily presented movable obstacle, which is not the always presented fixed object, such as the vehicle 620 parked in the parking area, a not-illustrated shopping cart temporarily placed in a cart storage space, and the vehicle 620 parked in the parking area.

If the feature points 611 of a plurality of parking information items are overlapped (high frequency) in a specific region in one grid when dividing the coordinate system into a plurality of grids each having a predetermined size (for example, area corresponding to 25 cm square of real space), the map creator 330 leaves, in the memory 320, the feature points 611 as the feature point 611 of the obstacle which is a fixed object.

On the other hand, as the feature point 621 separated (low frequency) from the feature points 611 of a plurality of parking information items in one grid is a feature point of a temporarily presented obstacle which is not a fixed object (for example, parked vehicle 620), the map creator 330 determines the feature point as data inappropriate as the fixed obstacle 600, and deletes the data from the memory 320. Accordingly, the map creator 330 does not use the feature point 621 for creating the map PP.

The map creator 330 thereby creates the map PP with the unmovable parking area line 710 and the feature point 611 of the wall 610 which is the fixed object of the obstacles 600, and stores the created map PP in the memory 320.

As illustrated in FIG. 6, the map creator 330 selects intersections k of the two or more traveling paths K as highly reliable passing points for the respective traveling paths K of a plurality of vehicles V (for example, traveling path K1 of vehicle V1, traveling path K2 of vehicle V2, and traveling path K3 of vehicle V3), and stores the line connecting the selected intersections k as the traveling path (guide path) K corresponding to the map PP in the memory 320.

Next, the operation of the parking assist system 1 of this embodiment will be described. At first, an arbitrary vehicle V stops in the parking lot P, a driver gets off from the vehicle V, and the driver inputs an instruction for starting the parking assist operation to the information communication terminal 200.

The instruction for starting the parking assist operation input to the information communication terminal 200 is input to the transmitter/receiver 60 of the parking assist device 100 provided in the vehicle V from the information communication terminal 200, and is transmitted as the request of the map PP for the parking lot P and the traveling path K corresponding to the map PP to the server 300 by the parking assist ECU 70.

The map creator 330 of the server 300 reads the map PP for the parking lot P and the traveling path K (FIG. 5) corresponding to the map PP stored in the memory 320 according to the request, and the transmitter/receiver 310 transmits the read map PP and traveling path K to the parking assist device 100 of the vehicle V which has transmitted the request.

The transmitter/receiver 60 of the parking assist device 100 receives the map PP and the traveling path K transmitted from the transmitter/receiver 310 of the server 300, and inputs the received map PP and traveling path K to the parking assist ECU 70.

The map PP and the traveling path K input to the parking assist ECU 70 are read in the guide signal output part 72. The guide signal output part 72 outputs the guide signal to the vehicle ECU 510. The guide signal corresponds to the driving operation (driving, braking, and steering) for moving the vehicle V along the traveling path K to the specific parking area S on the input map PP.

The specific parking area S may be selected by a driver or may be automatically selected by the parking assist ECU 70. When the specific parking area S is selected by a driver, the parking area is presented to the driver by displaying the map PP on the monitor 41 of the navigator 40, for example, and the selection by the driver is received through the touch panel monitor 41, for example.

On the other hand, when the specific parking area S is automatically selected by the parking assist ECU 70, the parking area S having the shortest distance of the traveling path K from the present position of the vehicle V, for example, may be selected. The method of automatically selecting the specific parking area is not limited thereto.

When the vehicle V is moved toward the parking area S, the situation around the vehicle V is monitored in real time by the camera 20 and the sonar 30 of the vehicle V, and it is monitored that no obstacle 600 presents in the tracking range of the vehicle V which moves along the traveling path K. When the obstacle 600 is detected in the tracking range of the vehicle V, the parking assist ECU 70 outputs a signal for stopping the vehicle V to the vehicle ECU 510. The vehicle ECU 510 controls the braking actuator 520 to immediately stop the vehicle V, and stops the vehicle V such that the vehicle V avoids the obstacle 600.

As described above, according to the parking assist system 1 of this embodiment, the parking information item when the vehicle V is parked in the parking area S in the parking lot P is stored in the server 300 different from the vehicle V, not the parking assist device 100 of the vehicle V. With this, each vehicle V may be automatically parked in each parking lot without having a large capacity memory which is required for storing parking information items for many parking lots P.

The parking information item acquired by another vehicle V in addition to the own vehicle is accumulated in the server 300 to create the map PP and the most appropriate traveling path K. With this, each vehicle V may be automatically parked based on the map PP and the traveling path K created by the server 300 without manually teaching the parking operation even in a parking lot without a past experience of a manual parking operation.

In the parking assist system 1 and the server 300 of this embodiment, the map creator 330 does not use the data (for example, feature point 621) inappropriate as the obstacle 600 of the fixed object for creating the map PP. However, as the feature point 621 represents the temporarily presented vehicle 620, which is not the fixed object, for example, and such a vehicle is also the obstacle 600, the feature point 621 may be used for creating the map PP similar to the feature point 611 without deleting the feature point 621, for example, as the inappropriate data.

In the parking assist device 100 of this embodiment, the obstacle 600 is detected by the sonar 30. However, the parking assist device and the parking assist system according to this disclosure are not limited to those which detect the obstacle 600 by the sonar 30.

Accordingly, in the parking assist device and the parking assist system according to this disclosure, a millimeter wave radar or Light Detection and Ranging (LiDAR) may be adopted as an obstacle detector which detects an obstacle.

The server 300 of the parking assist system 1 of this embodiment outputs the uniform traveling path K to the parking assist device 100 of the vehicle V which has requested a map, regardless of the size (total length, total width) of the vehicle V which has required a map.

However, the traveling path K of the vehicle V generally differs according to the size of the vehicle V. Namely, as a vehicle having a longer total length and a vehicle having a wider total width generally has the larger minimum rotation radius, such vehicles may not move along the traveling path K which is acquired by a small vehicle having a shorter total length or a narrower total width and stored in the memory 320.

Accordingly, the parking assist device 100 of the parking assist system 1 may add the size of the vehicle V to the parking information item which is transmitted to the server 300, and the memory 320 of the server 300 may store the parking information item associated with the size of the vehicle V, and the map creator 330 may create the traveling path K according to the size of the vehicle V to transmit, to the parking assist device 100, the traveling path K associated with a vehicle having the same size as the vehicle which has requested a map.

The parking assist system 1 can thereby guide the vehicle V to the parking area S in accordance with the traveling path K suitable for the size of the vehicle V which has requested a map.

What is claimed is:

1. A parking information management server, comprising:
a receiver configured to receive at least one parking information item transmitted from one or more vehicles regarding one or more parking lots, the at least one parking information item comprising a traveling path in which the vehicle has traveled as well as a parking area and an obstacle which are acquired by a vehicle in a parking lot the vehicle has used;
a memory configured to store the at least one parking information item received by the receiver;
a map creator configured to create a map comprising the parking area and the obstacle based on the at least one parking information item stored in the memory; and
a transmitter configured to automatically transmit the map created by the map creator and the traveling path stored in the memory to a vehicle which has requested the map,
wherein the map creator is configured to determine suitability of a plurality of parking information items for each parking lot, which are stored in the memory, as data for creating the map according to a frequency of the parking information item corresponding to a same position, and not to use data determined as inappropriate data for creating the map.

2. The parking information management server according to claim 1,
wherein the memory is configured to store the at least one parking information item associated with information regarding a size of the vehicle which is acquired together with the at least one parking information item from the vehicle, and
wherein the map creator is configured to create, among the traveling paths, the traveling path in the at least one parking information item acquired from the vehicle having a same size as the vehicle which has requested the map.

3. A parking assist device comprising:
a receiver configured to receive the map transmitted from the parking information management server according to claim 1,
a position detector configured to detect a position of the vehicle;
a camera configured to detect a parking area by photographing a periphery of the vehicle;
an obstacle detector configured to detect an obstacle in the periphery the vehicle; and
a guide signal output part configured to output a signal to a vehicle controller that controls driving of the vehicle to guide the vehicle based on the map and the traveling path received by the receiver.

4. A parking assist system comprising:

a parking information management server including:
- a receiver configured to receive at least one parking information item transmitted from one or more vehicles regarding one or more parking lots, the at least one parking information item comprising a traveling path in which the vehicle has traveled as well as a parking area and an obstacle which are acquired by a vehicle in a parking lot the vehicle has used;
- a memory configured to store the at least one parking information item received by the receiver;
- a map creator configured to create a map comprising the parking area and the obstacle based on the at least one parking information item stored in the memory; and
- a transmitter configured to automatically transmit the map created by the map creator and the traveling path stored in the memory to a vehicle which has requested the map, and a parking assist device comprising:
- a receiver configured to receive the map transmitted from the parking information management server;
- a position detector configured to detect a position of the vehicle;
- a camera configured to detect a parking area by photographing a periphery of the vehicle:
- an obstacle detector configured to detect an obstacle in the periphery the vehicle; and
- a guide signal output part configured to output a signal to a vehicle controller that controls driving of the vehicle to guide the vehicle based on the map and the traveling path received by the receiver.

* * * * *